United States Patent [19]
Coone

[11] 3,854,694
[45] Dec. 17, 1974

[54] APPARATUS FOR AN AGGREGATE PUMP

[76] Inventor: Malcolm G. Coone, 10521 Greenwillow, Houston, Tex. 77035

[22] Filed: Feb. 2, 1973

[21] Appl. No.: 329,106

Related U.S. Application Data
[62] Division of Ser. No. 77,068, Oct. 1, 1970, Pat. No. 3,749,521.

[52] U.S. Cl............................ 251/5, 138/93, 277/34, 285/106
[51] Int. Cl............................................. F16j 15/48
[58] Field of Search.......... 251/4, 5, 6, 7, 8; 277/34, 277/34.6, 74, 116.8, 235; 138/93; 166/120; 285/97, 106, 107

[56] References Cited
UNITED STATES PATENTS

| | | | |
|---|---|---|---|
| 2,643,722 | 6/1953 | Lynes et al. | 277/235 |
| 2,778,432 | 1/1957 | Allen | 277/235 |
| 2,828,823 | 4/1958 | Mounce | 277/235 |
| 3,494,588 | 2/1970 | Kisling | 251/5 |
| 3,604,732 | 9/1971 | Malone | 277/34 |

Primary Examiner—William R. Cline
Assistant Examiner—George L. Walton
Attorney, Agent, or Firm—Pravel & Wilson

[57] ABSTRACT

An aggregate reservoir receives aggregate which is mixed by a plurality of mixer blades, one of each of which is mounted with one of each of a plurality of reciprocating shafts. One of each of the shafts extends outwardly into one of each of a plurality of conduits. As each of the reciprocating shafts moves inwardly in its respective conduit, expandable means mounted on the end of the shaft forces aggregate ahead of the shaft and through an opened gate or expandable means in the conduit. As each of the reciprocating shafts moves back toward the reservoir, the expandable means on the end of the shaft contracts and such gate with the respective conduit is closed to prevent aggregate from returning to the area of the respective reciprocating shaft. Each of the plurality of conduits is merged or joined into one single conduit some distance from their respective reciprocating shafts, and the aggregate from each of the conduits is moved through the single conduit to desired horizontal and/or vertical locations.

The expandable means and/or gates of the present invention include an inner sheath of expandable material, a plurality of flexible reinforcing hard members and an outer sheath of expandable material, if desired.

20 Claims, 14 Drawing Figures

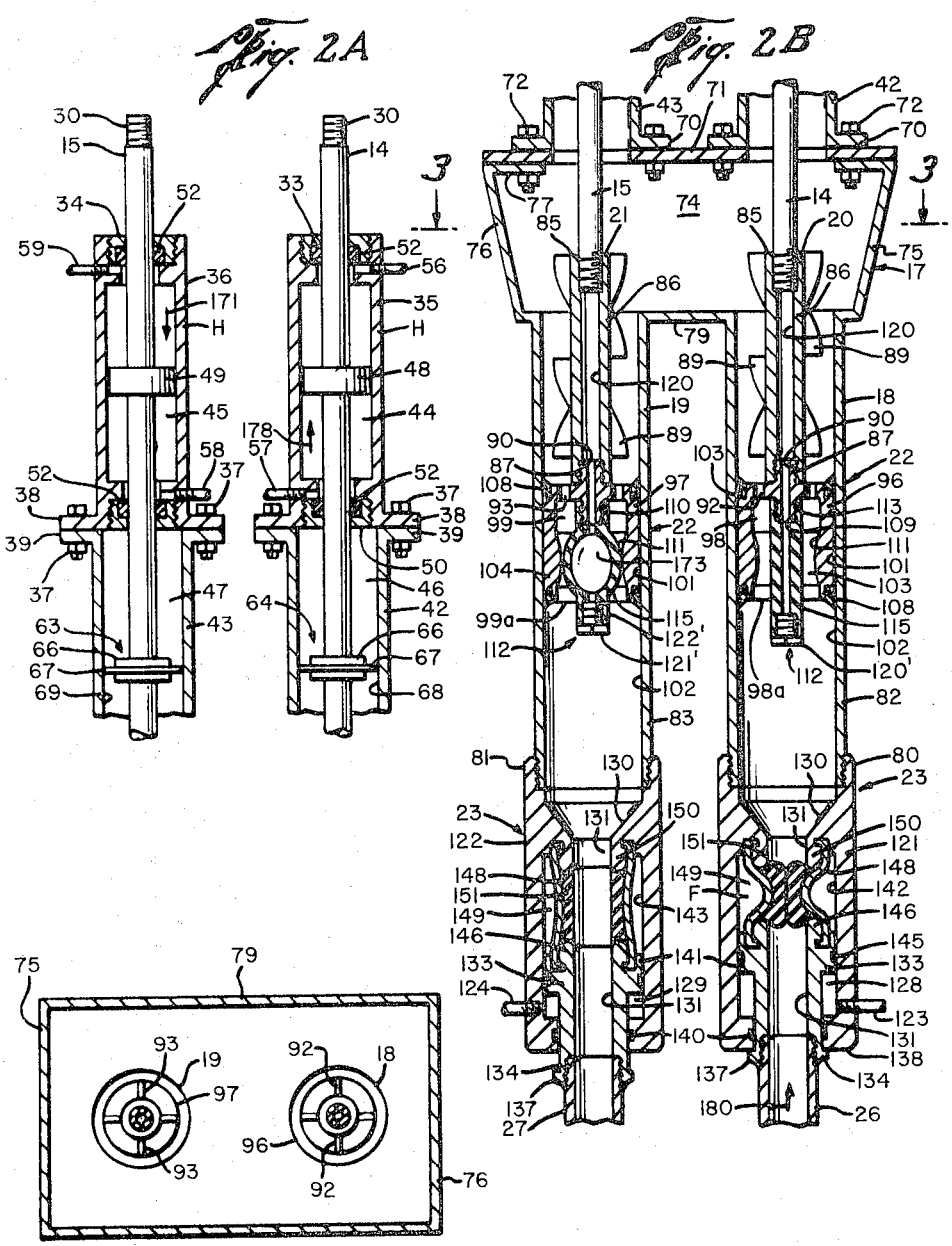

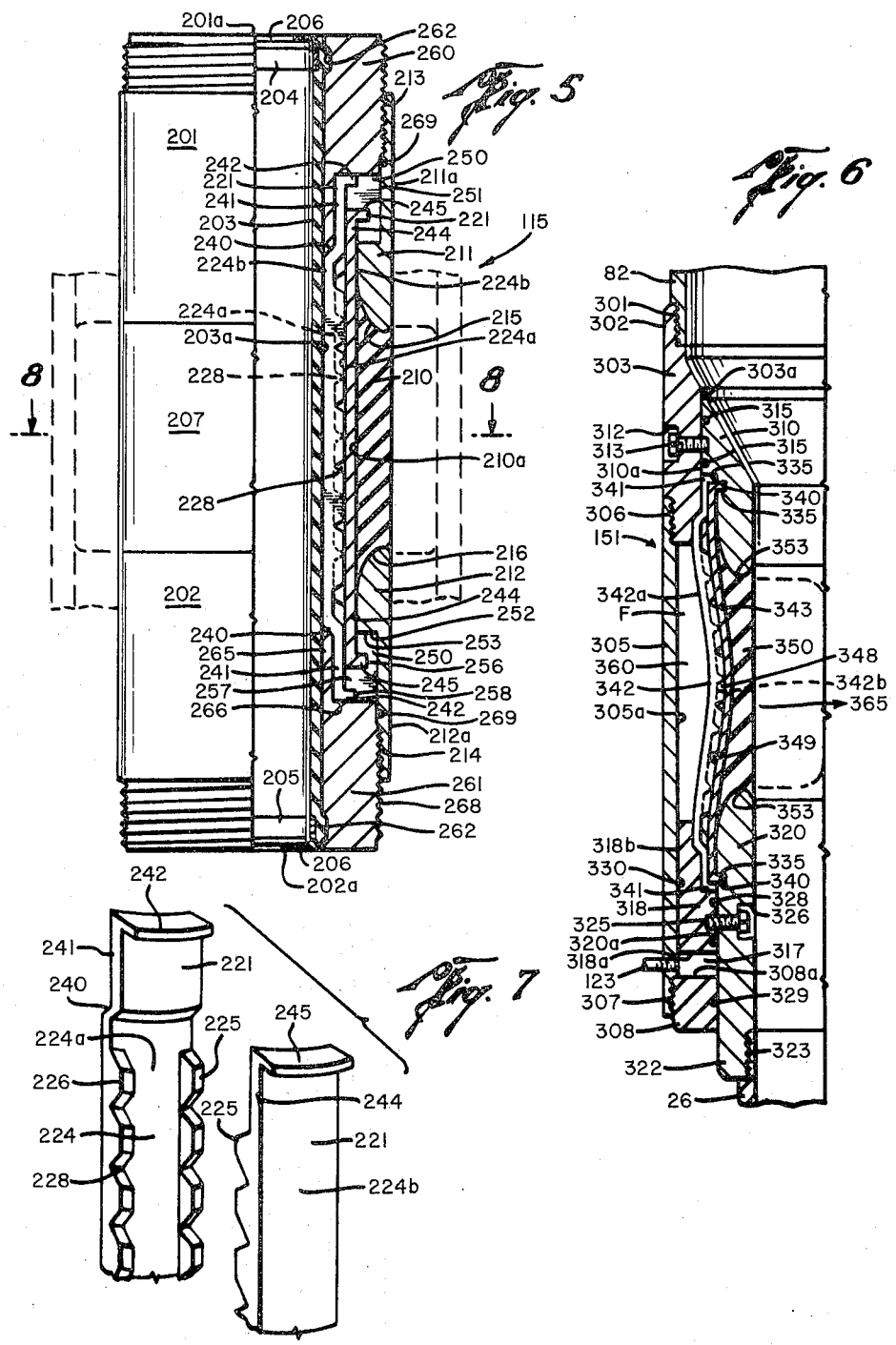

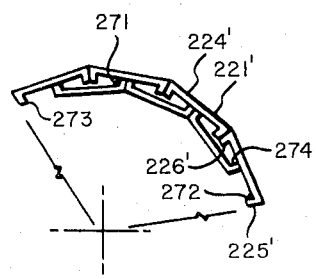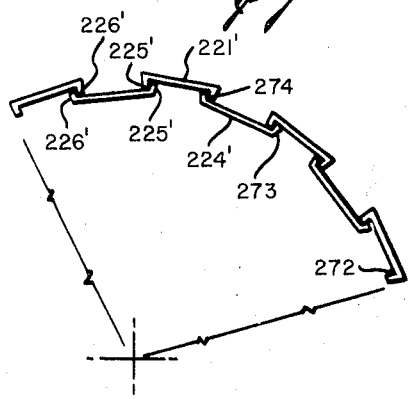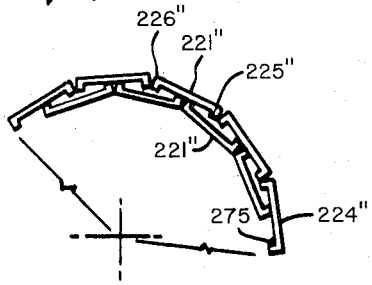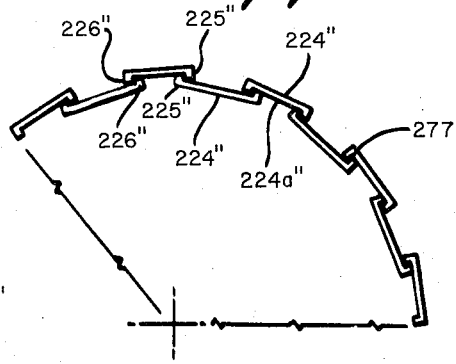

APPARATUS FOR AN AGGREGATE PUMP

CROSS REFERENCE TO RELATED APPLICATIONS

This is a division of application Ser. No. 77,068, filed Oct. 1, 1970, and now U.S. Pat. No. 3,749,521.

BACKGROUND OF THE INVENTION

1. Field of the Invention

This invention relates to aggregate pumps and more particularly to a new and improved aggregate pump and new and improved expandable members for use therewith and for other uses.

In the prior art, the most common method known for transmitting aggregate from one location to the other, especially to vertical locations, was the use of the crane and bucket wherein the crane would lift a bucket filled with aggregate to such vertical location. However, this method had many shortcomings including the transmittal of "batch" loads of aggregate, a limitation of the vertical locations that could be reached due to the limitation of lack of vertical height of the crane, and the slowness inherent in a process which included filling a bucket with concrete from a concrete truck, lifting the bucket to a desired vertical location, emptying the bucket into wheelbarrows or into the desired form, and then lifting the bucket and sitting it back down on the ground for refilling.

One other type of system used for pumping aggregate is illustrated in U.S. Pat. No. 3,180,272. This concrete pump is called a "Squeez-Crete" and utilizes a pump tube which is squeezed by a roller to force aggregate through the pumping tube and down into other conduits to vertical and horizontal locations. In this type of operation, and in the old piston-type aggregate pumps, the aggregate had to be re-mixed before transmittal through the conduits. The Squeez-Crete forced aggregate ahead of a heavy roller, which meant that eventually the conduit being squeezed failed and had to continually be replaced. Further, such aggregate pump was limited to "pumping" aggregate as high as five or six stories, vertically.

In the old piston-type pumps the aggregate was pounded and continually had to be re-mixed. Further, most of the piston-type pumps were water-lubricated and during breakdowns or failure of seals, water was forced into the mix which endangered the mix design, caused segregation of the mix and caused possible "plugs" of the cylinders valves, thus causing costly down time.

In the expandable members used herein, the most pertinent prior art found by applicant was U.S. Pat. No. 2,778,432 and U.S. Pat. No. 2,778,431. The well packers disclosed therein included an inner rubber tube, a plurality of helically positioned strands for reinforcing and an outer wrapping of rubber.

In the construction of such packers, each strand had to be welded or tied in position which required costly time and labor.

SUMMARY OF THE INVENTION

Briefly, the present invention relates to a new and improved aggregate pump, including a reservoir for receiving the aggregate, one of each of a plurality of reciprocating shafts extending through the reservoir and into one of each of a plurality of conduits, one of each of a plurality of expandable means for moving the aggregate ahead of the reciprocating shafts as each of the respective shafts moves into its respective conduit and expandable means for closing each of the respective conduits as each of the respective shafts moves outwardly relative to respective conduit toward the reservoir.

Also, the present invention relates to a new and improved expandable member for use with the concrete pump of the present invention and for other uses which includes an inner and outer resilient sheath positioned concentrically relative to each other, a plurality of reinforcing longitudinally extending strips positioned in an annulus between said sheaths and support members spaced relative to each other for supporting the inner and outer sheath and longitudinally expanding strips wherein pressure on the strips or concentrically positioned sheaths enables the expandable member to expand radially outwardly and inwardly as desired.

One object of the present invention is to provide a new and improved method and apparatus for an aggregate pump to enable aggregate to be moved to desired horizontal and vertical locations.

Still yet another object of the present invention is to provide a new and improved aggregate pump having a plurality of reciprocating shafts and matching respective conduits, wherein as one of the respective shafts moves toward its respective conduit, means on the end of such respective shaft expands outwardly to force aggregate into such conduit and means in the conduit contracts to open the conduit to enable aggregate to move therepast.

Yet another object of the present invention is to provide a new and improved method and apparatus for an aggregate pump which eliminates a re-mixing system and which is more economical and efficient to use.

Yet another object of the present invention is to provide a new and improved expandable member which is easy to construct and maintain.

Still yet another object of the present invention is to provide a new and improved expandable member wherein all elements thereof may expand radially outwardly and inwardly in response to pressure.

BRIEF DESCRIPTION OF THE DRAWINGS

FIG. 2A is a partial cross-sectional view of the aggregate pump of the present invention.

FIG. 2B is a partial cross-sectional view illustrating the aggregate pump of the present invention and including its aggregate reservoir, reciprocating shafts and respective conduits for transmitting aggregate;

FIG. 3 is a cross-sectional view taken along line 3—3 of FIG. 2B illustrating the relationship of a fluid reservoir relative to a pair of mixing blades mounted with a respective pair of reciprocating shafts;

FIG. 5 is a cross-sectional view of one embodiment of the expandable member of the present invention;

FIG. 6 is a partial cross-sectional view of yet another embodiment of the expandable member of the present invention;

FIG. 7 is a view taken along line 7—7 of FIG. 5 illustrating the relationship of a pair of a plurality of longitudinally extending flexible reinforcing U-shaped members;

FIG. 10A is a partial top view of an alternative embodiment of the radially expandable longitudinal strips of the present invention;

FIG. 10B is a view similar to FIG. 10A with the longitudinal strips illustrated in their expanded position;

FIG. 11A is a partial top view of another embodiment of the radially expandable longitudinal strips of the present invention; and FIG. 11B is a view similar to FIG. 11A illustrating the longitudinal strips in their expanded position.

DESCRIPTION OF THE PREFERRED EMBODIMENT

Figure 1:
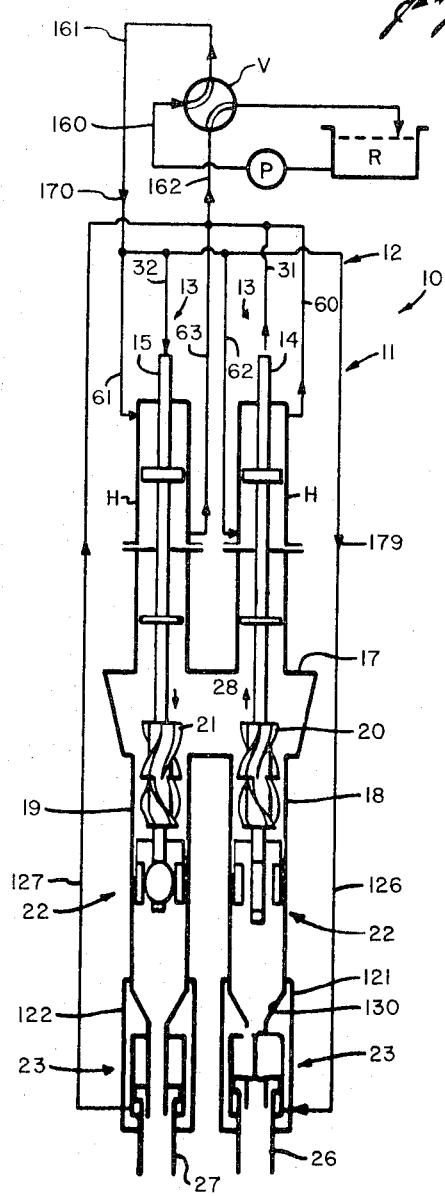
FIG. 1 is a schematic view of the present invention illustrating a cycle of a pair of reciprocating shafts and hydraulic fluid lines therefor.
Figure 4:
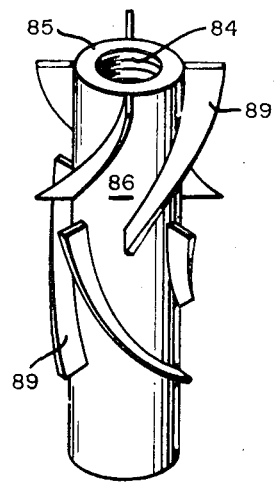
FIG. 4 is an elevational view illustrating a mixer blade of the present invention.

As illustrated in FIG. 1, a schematic representation, the method and apparatus for an aggregate pump is generally represented by the numeral 10, and includes a hydraulic fluid reservoir R, a plurality of conduit hydraulic lines generally designated at 11, a plurality of shaft moving hydraulic conduit lines generally designated at 12, and a plurality of hydraulic lines designated at 13 communicating with a pair of reciprocating shafts 14 and 15. A housing H receives each of the shafts 14 and 15 and such housing H communicates with an aggregate reservoir 17. As illustrated in FIG. 1, each of the shafts 14 and 15 extend through the reservoir 17 and into a pair of aggregate receiving conduits 18 and 19, respectively.

A pair of mixing blades 20 and 21 are mounted with each of the shafts 14 and 15, respectively, for reciprocating relative to the aggregate receiving conduits 18 and 19. An expanding or yieldable means generally designated at 22 is mounted on one of each of the ends of the shafts 14 and 15 for moving aggregate in front of such means when the means 22 has been expanded. A yieldable conduit blocking means generally designated at 23, mounted with each of the aggregate receiving conduits 18 and 19, is open when the means 22 is expanded to permit aggregate to move outwardly through conduits 26 and 27, and closes when such shaft 14 moves in the direction of the arrow 28.

The foregoing is a brief description of the operation of FIG. 1 and FIG. 1 will be referred to hereinafter after a detailed description of various parts of the invention as illustrated in FIGS. 2A, 2B, 3 and 4.

As illustrated in FIGS. 2A and 2B, each of the shafts 14 and 15 are threadedly engaged at one end 30 thereof to receive hydraulic fluid lines 31 and 32, respectively, (FIG. 1). The housing H for each of the shafts 14 and 15 includes plugs 33 and 34 threadedly engaged in the ends of cylinder members 35 and 36. Each of the cylinder members 35 and 36 is connected through suitable nut and bolt means 37 and flange member 38 to matching flange members 39 of a pair of cylindrically shaped members 42 and 43, respectively.

Each of the shafts 14 and 15 extend through hollow portions 44 and 45, respectively, of each of the cylindrical members 35 and 36, respectively, into the hollow portions 46 and 47, respectively, of the members 42 and 43. Piston heads 48 and 49 are positioned circumferentially around each of the shafts 14 and 15, respectively, in the openings 44 and 45, respectively, for moving the shafts 14 and 15 longitudinally relative to the cylindrical members 35 and 36.

Sealing plugs 50 and 51 are threadedly engaged into the end of each of the cylindrical members 35 and 36 adjacent the cylindrical members 42 and 43, respectively, for preventing the leakage of hydraulic fluid into the openings 46 and 47, respectively. A plurality of circumferentially positioned packing members 52 is mounted with each of the sealing plugs 33, 34, 50 and 51, respectively, and positioned circumferentially relative to the shafts 14 and 15, respectively, to prevent leakage of hydraulic fluid from the cylinder openings 44 and 45, respectively.

As illustrated in FIG. 2A, hydraulic ports 56 and 57 and hydraulic ports 58 and 59 communicate with the interior hollow portions 44 and 45, respectively, for enabling the hydraulic fluid to move the double faced (not numbered) pistons 48 and 49 in desired directions as is well known in the art. As illustrated in FIG. 1, hydraulic fluid lines 60 and 61 are connected with the ports 56 and 59 (FIG. 2A), respectively, and hydraulic fluid lines 62 and 63 are connected with the ports 57 and 58 (FIG. 2A), respectively.

As illustrated in FIG. 2A, flexible wiping members generally designated at 63 and 64, respectively, include a circumferentially mounted body member 66 mounted with each of the shafts 14 and 15. A circumferentially radially extending flexible wiper member 67 is mounted with the body member 66 to prevent aggregate and the like from moving past such wiping members 63 and 64, body member 66 and flexible wiper 67.

The flexible member 67 extends outwardly and contacts the inner walls 68 and 69, respectively, of the cylindrical members 42 and 43 and are carried on the reciprocating shafts 14 and 15, respectively.

As illustrated in FIG. 2B, flange members 70 of each of the cylindrical members 42 and 43 abut a top wall 71 of the aggregate reservoir generally designated at 17. Suitable pairs of nut and bolt members 72 extend through the flange members 70 and top wall 71 for securing the cylindrical members 42 and 43 to the top wall 71. The aggregate reservoir 17 includes a back wall 74, the top wall 71, a bottom wall or floor 79, and a pair of sidewalls 75 and 76, each of which are secured through suitable flange members 77 with the outside nut and bolt means 72 adjacent the cylindrical members 42 and 43, respectively.

The bottom wall 79 of the aggregate reservoir 17 divides the aggregate receiving conduits 18 and 19 which extend outwardly from adjacent the sidewalls 75 and 76, respectively. The closure member section gates or expandable members generally designated at 23, include female end members 80 and 81, respectively, which are threaded internally (not numbered) to receive the male end members 82 and 83, which are also threaded to match into threaded engagement with the female member sections 80 and 81, respectively.

Each of the shafts 14 and 15 extend through the cylindrical members 42 and 43, respectively, into the reservoir 17.

The mixer blade members 20 and 21 include internal threads 84 (FIG. 4) at one end 85 (FIG. 4) for receiving and engaging the threads (not numbered) on the ends of each of the shafts 14 and 15, respectively. Each of the mixer members 20 and 21 include a cylindrical body section 86 which is hollow for communicating with the eccentric hollow shafts 14 and 15. Each of the longitudinally extending bodies 86 of the mixers 20 and 21 is threadedly engaged at 87 to the members generally designated at 22 and referred to hereinabove. Each of the members 20 and 21 also includes a plurality of randomly positioned arcuate blades 89 positioned by any suitable means such as welding on the body 86 at random angles relative to each other and to the longitudinal axis of the body 86 to continually agitate and mix the aggregate in the reservoir 17 and conduits 18 and 19 during reciprocation of shafts 14 and 15.

Each of the members 22 includes male threaded members 90 and 91, respectively, which receive the female portion (not numbered) of each of the mixer members 20 and 21 for threaded engagement at 87 as previously mentioned hereinabove. Wing or vane members 92 and 93, respectively, extend outwardly from the male members 90 and 91, as illustrated in FIGS. 2B and 3, and are connected to sliding circumferential members 96 and 97, respectively.

As illustrated in FIGS. 2B and 3, the circumferential members 96 and 97 are mounted with and extend radially outwardly from the vanes 92 and 93. Such members 96 and 97 are hollow on the interior thereof as illustrated by the openings 98 and 99, respectively. The outer surface 101 of the circumferential members 96 and 97 extends outwardly to and contacts the interior wall 102 of each of the aggregate receiving conduits 18 and 19, respectively.

Each of the outer ends 103 and 104 of the members 96 and 97 is provided with sealing members 108 for maintaining a seal between the interior wall 102 of the conduits 18 and 19 and the outer surface 101 of the members 96 and 97, respectively, to prevent leakage of any fluid or aggregate thereby.

As illustrated in FIG. 2B, the openings 98 and 99 formed in the interior of the members 96 and 97, are larger in diameter than the adjacent male plugs 109 and 110, respectively. An inwardly curved surface 111 of each of the members 96 and 97 reduces the diameter of the openings 98 and 99, respectively, immediately adjacent expandable or inflatable means generally designated at 112.

Each of the expandable means 112, which are set forth in more detail in FIGS. 5, 7-11, includes a female threaded section 113 for threaded engagement with the support of male members 109 and 110, respectively. The inflatable or expandable means 112 also includes an inflatable element 115 which communicates with the hollow concentric shafts 14 and 15, respectively, and with a channel 120 extending through the body 86 of each of the mixing members 20 and 21 and the male members 90, 91, 109 and 110, respectively. The expandable means 112 extends outwardly from the mouth 98a and 99a, respectively, of each of the openings 98 and 99, and as illustrated in FIG. 2B, support or plug members 120' and 121' are inserted in the outwardly extending portion 122' of each of the inflatable elements 115 to prevent the hydraulic or inflation fluid from leaking into the aggregate.

Each of the female sections 80 and 81 of the members generally designated at 23 is integrally mounted with a cylindrical body 121 and 122. Hydraulic fluid ports 123 and 124 are secured with hydraulic lines 126 and 127 and communicate with circumferential chambers 128 and 129 formed in each of the bodies 121 and 122, respectively. The interior of the bodies 121 and 122 is machined such that the slanted surface 130 reduces the diameter of the channel 131 extending through each of the bodies. A movable section 133 mounted with each of the bodies 121 and 122, includes a threaded end 134 which receives a male threaded section (not shown) of suitable conduits 26 and 27, respectively. The movable section 133 also includes on the end 134, an outwardly extending tip 137 to prevent further movement of the section 133 into the bodies 121 and 122. Section 133 extends inwardly past the ends 138 and 139 of each of the bodies 121 and 122 adjacent the chambers 128 and 129 and bore 131. The movable section 133 and the ends 138 and 139 of the bodies 121 and 122 are provided with a suitable O-ring seal connection 140 to prevent loss of hydraulic fluid as will be set forth hereinafter. An outwardly radially extending section 141 extends outwardly and contacts the inner walls 142 and 143, respectively, of each of the bodies 121 and 122 for sliding contact with another O-ring seal and slot section 145 provided for preventing leakage of hydraulic fluid.

The end section 146 of each of the movable members 133 receives and anchors, as illustrated in FIG. 2B, a plurality of flexible strips or members 148. Each of the flexible steel members extends longitudinally from the anchoring end section 146 of the movable member 133 across an opening 149 formed in the bodies 121 and 122 for permanent anchoring with the tip portion 150 of the bodies 121 and 122. Expandable or inflatable elements 151, which are set forth in more detail hereinbelow and illustrated in FIG. 6, are mounted with and connected to the flexible strip members 148 for expanding and extending outwardly and inwardly to block and open the bore 131 as illustrated in FIG. 2B and as will be set forth hereinafter. The openings 149 around the metal members 148 in each of the body sections 121 and 122, are filled with a suitable oil or other fluid for providing lubrication for the flexible metal members 148.

In the operation of the invention and as illustrated in FIGS. 1, 2A and 2B, the hydraulic reservoir R communicates through a hydraulic fluid line 160 with a pump P and a suitable double acting valve V, as is well known in the art. One main hydraulic fluid line 161 communicates with fluid line 61, fluid line 32, hydraulic fluid line 62 and hydraulic fluid line 126. Similarly, hydraulic fluid line 162 communicates with and provides hydraulic fluid for hydraulic fluid line 127, hydraulic fluid line 63, hydraulic fluid line 31 and hydraulic fluid line 60.

When aggregate is poured into the aggregate reservoir 17 the apparatus of the present invention can either be positioned vertically or the reservoir can be tilted relative to the conduits 26 and 27 so that aggregate will move downwardly into the aggregate receiving conduits 18 and 19. As aggregate is poured into the reservoir 17 the reciprocating shafts are moving inwardly and outwardly relative to the reservoir 17 and aggregate receiving conduits 18 and 19.

For example, and as illustrated by the arrows in FIG. 1 and the position of the inflatable element 115 positioned in conduit 19, to move shaft 15 into such conduit 19, hydraulic fluid is pumped through hydraulic fluid line 161 into hydraulic fluid line 61 in the direction of the arrow 170 and into the fluid chamber 45 through the port 59 to move the piston head and shaft 15 in the direction of the arrow 171 (FIG. 2A). Such action moves the shaft into the conduit 19 and moves the mixer member 21 relative to the aggregate. Substantially simultaneously, with such fluid flow, fluid also flows through the fluid line 161 and into fluid line 32, through the hollow shaft 15 and the channel 120 into the interior 173 of the inflatable member 115 positioned in the conduit 19. Such action inflates the member 115 outwardly so that such member contacts the curved walls 111 and presents a sealed, blocked construction to cement positioned in front of the movable member 97 and the inflated element 115. It should be noted that cement is moved adjacent to the member generally designated as 23 by falling or moving through the opening 99 in the vanes 93.

Substantially simultaneously with such fluid flow set forth hereinabove, fluid flows through the fluid line 161 and through the conduit 62 into the fluid chamber 44 to contact the piston head 48 and move such piston head 48 and shaft 14 in a direction of the arrow 178. Substantially simultaneously with such fluid flow in conduit 62, fluid flows through the conduit 61 and conduits 126 in the direction of the arrow 179 and in through the port 123 into the opening 128 to cause such movable elements 133 and the piston in the body 121 to move upwardly in the direction of the arrow 180, which thereby bends or flexes the flexible member 148 inwardly to cause the inflatable elements 151 positioned therein to expand inwardly to contact each other and seal the bore 131 in the body section 121. Thus, any aggregate which has already been pushed past the inflatable elements 151 in body section 121 is prevented from moving back into the conduit 18.

As the shaft 15 moves into the conduit 19, the direction of the fluid flow through conduits 127, 63, 31 and 60 is such that the inflatable element 151 positioned in the body member 122 does not become inflated which thus enables aggregate to be pumped or pushed therepast. Similarly, the inflatable element 115 positioned on the end of the shaft 14 does not inflate on the return stroke of shaft 14, which thus permits aggregate to move and drop past the mixer blades 89 through the vanes 92 and opening 98 of the movable member 96 for positioning relative to the downward stroke of the shaft 14.

While only one complete cycle has been described hereinabove, it should be readily apparent that such shafts 14 and 15 reciprocate relative to the fluid flow and that the foregoing cycle set forth hereinabove is merely illustrative of one cycle.

Further, it should also be noted that the conduits 26 and 27 may be joined or merged at some point for continuous flow of aggregate to a desired location through a single conduit. It should also be noted that there is no limitation on the number of reciprocating shafts, aggregate receiving conduits and their accompanying structure for operation thereof of the pump of the present invention.

As illustrated in FIGS. 5–11, the inflatable elements 115 and 151 are illustrated in detail.

As illustrated in FIG. 5, the inflatable element generally designated at 115 is positioned and supported by a pair of threaded support or collar members 201 and 202. An inner flexible resilient sheath or member 203 is positioned interiorly of each of the support members 201 and 202 by suitable retainer rings 204 and 205 mounted at each end 201a and 202a of the collar members 201 and 202, respectively. Each of the rings 204 and 205 is mounted interiorly of the support members 201 and 203 in any suitable manner by expansion, welding or threaded engagement with interior threads 206 to position the inner resilient member 203 relative to the collar members 201 and 202 in the space 207, therebetween.

Figures 8, 9:
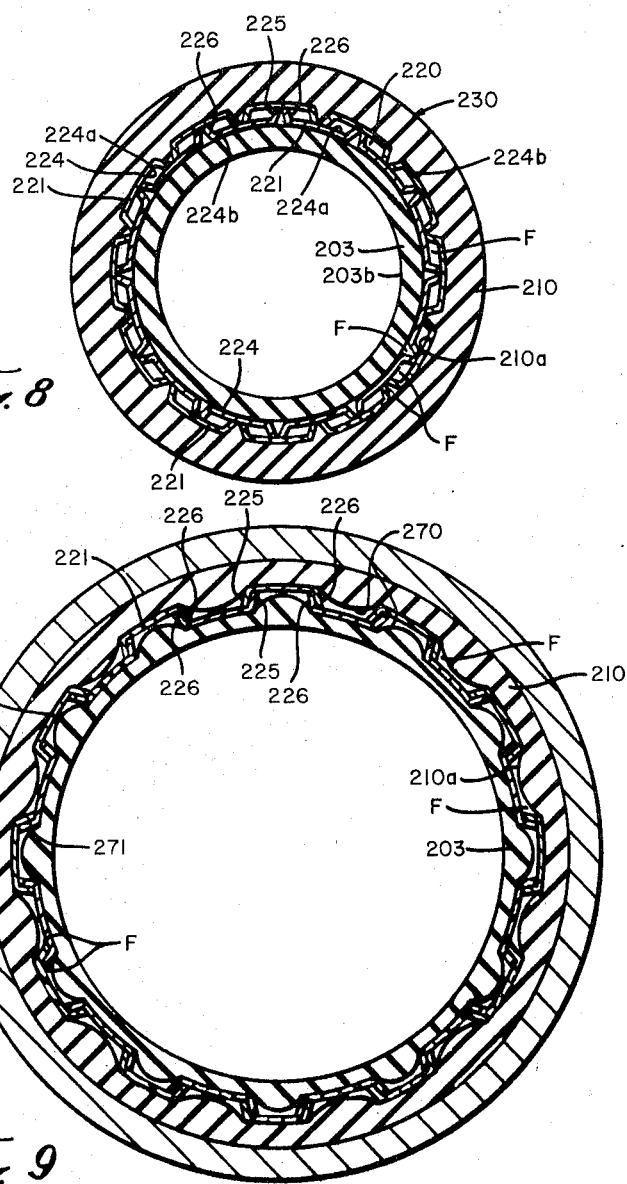
FIG. 8 is a cross-sectional view of the expandable member illustrated in FIG. 5.
FIG. 9 is a cross-sectional view of the expandable member of FIG. 5 in its expanded position.

As illustrated in FIGS. 5, 8 and 9, an outer resilient expandable member 210 is positioned concentrically relative to the inner sheath or expandable member 203 and is secured by any suitable means such as gluing, bonding or the like with spaced retainer collars 211 and 212 at each end thereof. Each of the retainer collars 211 and 212 are threadedly engaged with a portion of external threads 213 and 214 by engagement of such threads 213 and 214 with the internal threads (not numbered) of a threaded section 211a and 212a of the retainer members 211 and 212, respectively.

As illustrated in FIG. 5, each of the retaining members 211 and 212 are curved at one end 215 thereof to complementary match the curvature 216 of the outer resilient member 210 to retain such member in position in the space or opening 207 between the support members 201 and 202 by bonding as set forth hereinabove and for enabling a plurality of strip 221 to smoothly expand and contract.

As illustrated in FIGS. 8 and 9, a gap or annulus 220 is formed between the inner and outer resilient members 203 and 210. Positioned in such gap or annulus is a plurality of longitudinally positioned flexible, overlapping, expandable strips 221. Each of the longitudinal strips or U-shaped members 221 includes a body member 224 and outwardly extending first arms 225 and second arms 226.

As illustrated in FIGS. 5 and 7, each of the outwardly extending arms of the U-shaped or channel members 221 includes a plurality of grooves or recesses 228 therein for providing stress relief and for enabling lubrication to flow between such longitudinally positioned overlapping strips 221 as will be set forth hereinafter.

As illustrated in FIGS. 5, 8 and 9, certain of the longitudinal strips 221 are positioned such that the face or inner surface 224a fronts or faces the inner surface 210a of the outer resilient member 210. As illustrated in FIG. 5, the face or front surface 224a of the body 224 faces the resilient member 210 and the outer or rear surface 224b of the body 224 contacts or is adjacent the outer surface 203a of the inner resilient member 203. As further illustrated in FIGS. 5, 8 and 9, each of the first and second arms 225 and 226 of the longitudinal strip 221 abutting the inner resilient member 203 extend outwardly toward the outer resilient member 210. Each of the longitudinal strips 221 which abut the inner resilient member 203 are positioned and placed around such member to form a circular configuration as illustrated in FIGS. 8 and 9 to form a cylindrical configuration adjacent the inner cylindrical resilient sheath or member 203.

As illustrated in FIGS. 8 and 9, the arms 225 and 226 extending outwardly from each of the bodies 224 of the longitudinal strips 221 which face the resilient member 203 extend toward the longitudinal strips 221 which face the outer resilient member 210 such that the arms 225 and 226 of the resilient members of the longitudinal strips 221 facing the outer resilient member 210 are overlapped with the adjacent arms 225 and 226 of the longitudinal strips 221 facing the inner resilient member 203 to form a cylindrical shell 230. Also, as illustrated in FIGS. 8 and 9 each of the longitudinal strips 221 abutting the resilient member 203 and the longitudinal strips 221 abutting the outer resilient member 210 are positioned such that the arms 225 and 226 of the inner longitudinal strips 221 extend outwardly toward the bodies 224 immediately opposite from and adjacent each of the arms 225 and 226 when the inflatable element is in a deflated or partially inflated position.

As illustrated in FIGS. 5 and 7, the longitudinal strips 221 abutting the inner resilient member 203 each include an inwardly angled shoulder 240 at each end of the body 224. A longitudinally extending neck 241 extends outwardly from each of the shoulders 240 and is integrally mounted with a transversely extending tab member 242.

Each of the longitudinal strips 221 which abut the outer resilient member 210 also includes a longitudinally extending neck 244 which extends outwardly from each end of the body 224b. A transversely extending retainer and tab member 245 is mounted with each of the necks 244 and extends toward the outer resilient member 210 as does each of the transversely extending tabs 242.

As set forth hereinabove and as illustrated in FIGS. 5, 7, 8 and 9, each of the longitudinal strips 221 is positioned relative to each other such that the strips 221 abutting the outer resilient sheath 210 face the strips 221 abutting the inner resilient member 203 to enable the outwardly extending arms 225 and 226 of each of the strips extending toward the bodies 224 of such longitudinal strips 221 immediately adjacent such arms 225 and 226 to intermesh and interlock relative to each other when expansion occurs.

When the strips have been thus positioned, a pair of retainer strip members or rings 250 (FIG. 5), each having an outer surface 251 which abuts the retainer members 211 and 212, respectively, and a shoulder 252 abutting the shoulder 253 of each of the retainer members 211 and 212, respectively is positioned as illustrated and retained by member 211 and 212. Each of the retainer rings 250 includes a first recess 256 and shoulder 257 for receiving the transverse retainer arms 245 of the longitudinal strips 221 abutting the outer resilient member 210.

As further illustrated in FIG. 5, a second recess 258 in each of the rings 250 receives the transversely extending tabs 242 of each of the longitudinal strips 221 abutting the inner resilient member 203 for retention of the ends of such strips 221 relative to each other. A pair of holding members 260 and 261 are positioned at each end of the support members 201 and 202, respectively, and include a recessed or milled portion or area 262 for enabling the retainer rings 204 and 205 to position the inner resilient member 203 relative to the support members 201 and 202, respectively.

Each of the holding members 260 and 261 includes an arm member 265 which abuts the shoulders 240 and necks 241 of each end of the longitudinally extending strips 221 abutting the inner resilient member 203. A milled shoulder area 266 of each of the holding members 260 and 261 shoulders and abuts the transversely extending arms 242 and a portion of the strip retainer rings 250 as illustrated in FIG. 5.

Each of the holding members 260 and 261 includes external threads 268 which are threadedly engaged with the internal threads 213 and 214 collar portions 211a and 212a of the retainer members 211 and 212. O-ring seals 269 are included to prevent leakage of any fluid externally of the inflatable element 115 of the present invention.

As illustrated in FIG. 8, fluid F is positioned in the gaps or channels (not numbered) between the adjacent longitudinally positioned strips 221.

When it is desired to expand the expandible element 115 of the present invention, such expansion may occur in several different ways, such as by tension, compression, hydraulically or other ways. In terms of the concrete pump 10 of the present invention, the inflatable element is expanded hydraulically such that pressure on the inner surface 203b of the expandible element 203 causes the element 203 to expand radially outwardly and exerts pressure on each of the longitudinal strips 221 abutting the outer resilient member 210 to cause expansion of such strips 221 and the outer resilient member 210.

As illustrated in FIG. 9, with the inflatable element in its maximum inflated position, outward radial expansion of the strips 221 causes the arms 225 and 226 to interlock with immediately adjacent arms 225 and 226 of adjacent longitudinal strips. Thus, as illustrated in FIG. 9, the first arms 225 of each of the inflatable elements abutting the inner resilient member 203 move outwardly relative to the bodies 224 of the longitudinal strips 221 abutting the outer resilient member 210 to interlock with the first arms 225 of such strips 221 abutting the outer resilient member 210. Similarly, the second arms 226 of the longitudinal strips 221 abutting the inner resilient member 203 move outwardly to interlock or intermesh with the second arms 226 of the longitudinal strips abutting the outer resilient member 210 to prevent further outward radial expansion due to the interlocking of such arms 225 and 226 of the immediately adjacent strips 221.

As illustrated in FIG. 9, each of the inflatable resilient members 203 and 210 have also expanded radially outwardly such that certain sections or portions 270 thereof extend into the space (not numbered) between the channel or U-shaped members 221. Also, due to such expansion the fluid F has been displaced and fills the gaps or spaces (not numbered) not filled by the U-shaped or channel members 221 and the resilient members 203 and 210. Such fluid F is permitted to flow or move relative to the outward radial expansion of the channel members 221 due to the recesses or grooves 228 (FIG. 7), which thus enables the fluid to move through such spaces or gaps as the U-shaped members 221 expand radially outwardly.

It should also be noted and as ilustrated in FIGS. 8 and 9, each of the arms 225 and 226 are curved in an outward angle relative to the bodies 224 such that when adjacent arms 225 and 226 contact each other may complementary fit and engage each other as at 271 (FIG. 9).

As illustrated in FIGS. 10A and 10B, another embodiment of the longitudinal strips, U-shaped or channel members 221 is illustrated with such strips being indicated at 221'. Each of the strips 221' include a body 224° and outwardly extending arms 225' and 226' similar to the body 224 and arms 225 and 226 of the longitudinal strips illustrated in FIGS. 5, 7, 8 and 9. As disclosed in this embodiment, the arms 225' and 226' of the outer longitudinal strips 221' form an acute angle illustrated at 272, and the arms 225' and 226' of the inner longitudinal strips 221' form an obtuse angle illustrated at 273. As illustrated in FIG. 10B, outward radial expansion of the channel members 221' causes the arms 225' and 226' of the longitudinal strips 221' abutting the inner resilient member to intermesh with immediately adjacent arms 225' and 226', respectively, of the longitudinal strips 221' immediately adjacent and abutting the outer resilient member as set forth hereinabove. Due to the acute angle 272 of the outer longitudinal strips 221' and the obtuse angle 271 of the arms 225' and 226' of the inner longitudinal strips 221', the edge or corner 273 of such outer longitudinal strips 221' engage the corner angle 274 between the arms 225' and 226' and the bodies 224' of the inner longitudinal strips 221' as illustrated in FIG. 10B when such outward radial expansion occurs.

As illustrated in FIGS. 11A and 11B, longitudinal strips 221'' are similar to longitudinal strips 221 and 221', except that the outwardly extending arms 225'' and 226'' of each of the channel members 221'' are positioned and curved transversely relative to the inner surface or face 224a'' of the body 224'' of each of the longitudinal strips 221''. Each of the inwardly curving arms 225'' and 226'' thus forms a transverse angle illustrated at 276 relative to the body 224'' of each of the strips 221'' such that outward radial expansion of the inflatable member of the present invention which thus causes outward radial expansion of the longitudinal strips 221'' enables the arms 225'' and 226'' of the inner longitudinal strips 221'' to complementary lock as illustrated at 277 with the arms 225'' and 226'' of the outer longitudinal strips 221''.

While the inflatable element 115 has been illustrated as expanding outwardly, it should also be understood that such element, as illustrated in FIG. 9, is also adapted to be positioned in an expanded position and thereafter deflated to the position as illustrated in FIG. 8. If this is desired, the channel members 221 and the inner and outer resilient members 203 and 210, respectively, contract radially to the position of FIG. 8 such that the arms or ribs 225 and 226 move from the position as illustrated in FIG. 9 to the position as illustrated in FIG. 8.

It should also be understood that although the channel or U-shaped members 221 have been illustrated in FIGS. 8 and 9 as being positioned at their extremes, that is in a position as illustrated in FIG. 8 where first arms 225 of the inner longitudinal strips 221 contact second arms 226 of the outer longitudinal strips 221 or as illustrated in FIG. 9 where first arms 225 of the inner longitudinal strips 221 contact first arms 225 of the outer longitudinal strips 221 that the inflatable element of the present invention may be inflated to intermediate positions such that the arms will not necessarily contact each other.

As illustrated in FIG. 6, the inflatable element generally designated at 151 is threadedly engaged at 301 to a collar section 302 of a retainer member 303. A longitudinally extending housing member 305 is threadedly engaged to the retainer member 303 as illustrated at 306, and extends downwardly for threaded engagement as illustrated at 307 with ring member 308. An inner surface 310a of an anchor member 310 abuts an inner surface 303a of ring member 303. A milled or grooved recess 312 receives a bolt means 313 which extends through the member 303 for threaded engagement with the anchor member 310 to position such anchor member in place. Suitable O-ring seals 315 are provided for maintaining sealing engagement between the surfaces 303a and 310a to prevent leakage of fluid therethrough.

A conduit line such as, for example, hydraulic conduit line 123 (FIG. 2B) extends through the member 305 and communicates with a hydraulic fluid chamber 317 formed adjacent an inner surface 308a of the ring member, an inner surface (not numbered) of the member 305, the end shoulder 318a of a retainer member 318 and an outer surface 320a of an anchor member 320.

The retainer ring or member 318 abuts the inner surface 305a of member 305 adjacent the back 318b thereof. The anchor member 320 is threadedly engaged at one end 322 as illustrated at 323 to a conduit, for example, conduit 26 (FIG. 2B) and is retained in position and installable contact with the ring 308 by a bolt member 325 positioned in a machined or grooved recess 326. As illustrated in FIG. 6, the bolt member 325 also positions the ring member 318 immediately adjacent the anchor member 320 and suitable O-ring seals 328 are provided for maintaining sealing engagement therewith. Similarly, an O-ring seal 329 is provided between the ring 308 and anchor member 320 for slidable engagement therewith as will be set forth hereinafter. Also, it should be noted that O-ring seal 330 is positioned between the back 318b of the ring 318 and the inner surface 305a of the member 305 for slidable or movable engagement therewith as will be set forth hereinafter to prevent leakage of fluid.

Each of the anchor members 310 and 320 includes slots or grooves 335 therein for receiving transverse arms 340 and 341 of a plurality of longitudinally extending strips, channels or U-shaped members 342 and 343. Each of the longitudinally extending strips 342 and/or 343 includes a pair of outwardly extending arms or ribs 348 with machined or milled grooves 349 therein to provide stress relief for the strips and to enable fluid to communicate between the strips as will be set forth hereinafter. It is to be understood that such longitudinally extending strips as illustrated at 342 and 343 operate in the same manner as illustrated by the longitudinal strips disclosed in FIGS. 5, 7, 8, 9, 10 and 11.

As further illustrated in FIG. 6, an inner inflatable resilient member 350 is positioned between the anchor members 310 and 320 and is curved at each end 353 thereof to fit the curvature of such anchor members 310 and 320, respectively. The inflatable element 350 is connected to such anchor members 310 and 320 by any suitable means such as gluing, bonding or the like.

An annulus or chamber 360 is formed between the inner surface 305a of the member 305 in the back or outer surface 342a of the longitudinally extending strips 342. The arms 348 of the longitudinally extending strips 342 extend toward the resilient member 350 as illustrated and the arms 348 of the longitudinally extending strips 343 extend toward and face the inner surface or face 342b of the longitudinally extending strips 342. It should be noted that in the illustration of FIG. 5, that the longitudinally extending strips 342 and 343 are curved inwardly relative to the resilient member 350 to facilitate bending and flexing of the members 342 and 343 but such curvature of the members 342 and 343 is not necessary in all instances. A fluid F is positioned and placed in the chamber 360 to lubricate the strips and to cause the members 342 and 343 to curve inwardly along with the resilient member 350 in the direction of the arrow 365. When hydraulic fluid is pumped through the hydraulic line 123 into the chamber 317 such action causes the ring member 318 to slidably move toward the chamber 360 since the anchor member 320 is secured to the ring member 318 by bolt 325 such member also slidably moves forwardly or upwardly with such ring member. The O-ring seals 330 and 329 enable the ring member and anchor member 318 and 320, respectively, to move without leakage of fluid.

Movement of the ring member 318 upwardly or forwardly relative to the chamber 360 applies sufficient force on the longitudinal strips or channel members 342 and 343 to bend such strips into the interior 380 (bore 131 of FIG. 2B) which also causes the resilient member 350 to move into the interior. The upward movement of the anchor member 320 will also cause the conduit 26 to move forward with such anchor member.

It should be readily understood that with another expandable element 151 positioned opposite the expandable element 151 illustrated in FIG. 6, that such expansion into the interior 380 will enable the members 350 to contact each other to block or seal off the interior 380 between the conduits 82 and 26 to prevent the passing of concrete or other fluids or gases between the conduits 82 and 26.

The foregoing disclosure and description of the invention are illustrative and explanatory thereof, and various changes in the size, shape, and materials as well as in the details of the illustrated construction may be made without departing from the spirit of the invention.

I claim:
1. An expandable unit comprising:
   a. a hollow inner cylindrical expandable sheath;
   b. spaced holding members for supporting said inner sheath therebetween;
   c. an outer cylindrical expandable sheath positioned concentrically relative to said inner sheath
   d. spaced collar members for supporting said outer sheath therebetween;
   e. a plurality of longitudinally positioned strips positioned between said sheaths, said strips including:

1. a plurality of spaced longitudinal outer strips, each having arms and a body, said arms extending toward said inner sheath;
   2. a plurality of alternately spaced longitudinal inner strips, each having arms and a body, said arms extending toward said outer sheath;
   3. each of said arms of each of said outer strips overlapping with each of said adjacent arms of said inner strips contacting one adjacent body of said inner strips; and
   f. fluid means positioned between said inner and outer sheaths to provide continuous lubrication for said strips wherein pressure on said inner expandable sheath or fluid means causes said strips to expand radially outwardly until said arms of said inner strip interlock with said arms of said outer strip when said member is in its maximum expanded position.

2. The structure as set forth in claim 1 wherein positioning of said unit in an initial expandable position enables pressure on said inner expandable sheath to expand said outer expandable sheath.

3. The structure as set forth in claim 1 wherein said arms of said inner and outer strips are overlapped with adjacent arms of outer and inner strips, respectively, when said unit is partially expanded and/or contracted and wherein said arms do not interlock in such partially expanded and/or contracted position.

4. The structure as set forth in claim 1 wherein:
   a. said outer strips each includes a body and first and second arms, said first arm extending toward said body of an inner strip and said second arm extending toward said body of an adjacent inner strip;
   b. said inner strips each includes a body and first and second arms, said first arm extending toward said body of one of any outer strip and said second arm extending toward said body of an adjacent outer strip; and
   c. wherein expansion of said strips causes said strips to move radially outwardly until each of said first and second arms of said inner strip contacts one adjacent arm of said first and second arms of said outer strip in a maximum expanded position.

5. The structure as set forth in claim 4 wherein radial expansion of said strips enables one of each of said first arms of said inner strips to contact one of each of said first arms of said outer strips and one of each of said second arms of said inner strip to contact one of each of said second arms of said outer strips to prevent further radial expansion of said expandable unit.

6. The structure as set forth in claim 1 wherein each of said arms of each of said strips have grooves therein for enabling said fluid means to move relative to each of said strips.

7. An expandable unit comprising:
   a. a hollow inner cylindrical expandable sheath;
   b. spaced holding members for supporting said inner sheath therebetween;
   c. an outer cylindrical expandable sheath positioned concentrically relative to said inner sheath;
   d. spaced collar members for supporting said outer sheath therebetween;
   e. a first set of spaced longitudinally extending U-shaped members facing said outer sheath and a second set of spaced longitudinally extending U-shaped members facing said inner sheath, the U-shaped members in said first set being alternately disposed with respect to the U-shaped members in said second set; and
   f. each of said alternate U-shaped members in said first set being positioned such that they overlap with adjacent U-shaped members of said second set as said sheaths are expanded outwardly and inwardly.

8. The structure as set forth in claim 7 including fluid positioned between said sheaths for lubricating said U-shaped members and wherein each of said U-shaped members include grooves therein for enabling said fluid to flow and move between said members.

9. An expandable unit mounted with a tubular conduit including:
   a. support means disposed in said conduit and having an opening in said conduit;

b. an inner resilient member positioned interiorly relative to said conduit, said inner resilient member being supported by said support means;

c. an outer cylindrical member connected to said support means and positioned concentrically relative to said inner resilient member wherein an annulus is formed between said inner and outer members;

d. a plurality of longitudinally extending flexible support strips secured at each end with said support means and positioned in said annulus across said opening, each of said strips being a U-shaped member and being positioned longitudinally in said annulus such that alternate of said U-shaped members face said outer member and the remainder of said alternate U-shaped members face said inner resilient member and wherein each of said U-shaped members are overlapped with each adjacent U-shaped member;

e. fluid means positioned in said annulus for continuously lubricating said strips and wherein forces on said strips causes said strips to radially expand into the interior of the conduit which causes said inner resilient member to expand outwardly into the interior of the conduit to block said opening of said conduit.

10. The structure as set forth in claim 9 including an additional expandable unit mounted with said conduit.

11. The structure as set forth in claim 9 including collar members longitudinally spaced from each other and supporting said inner resilient member, one of said collar members is slidably movable relative to said conduit being for radial expansion of said strips to enable said inner resilient member to be urged into the interior of said conduit.

12. A yieldable unit comprising:
a. spaced support members;
b. an inner resilient sheath positioned between and supported by said spaced support members;
c. an outer resilient sheath positioned concentrically relative to said inner resilient sheath and supported by said support members, said outer resilient sheath being spaced from said inner resilient sheath forming a gap therebetween; and,
d. interlocking means on said inner and outer sheaths positioned concentrically in said gap relative to said inner and outer sheath for interlocking with each other to limit circumferential relative movement of said inner and outer sheaths, said interlocking means expanding and/or contracting radially in response to contraction and/or expansion of said inner and outer sheath.

13. The structure as set forth in claim 12 wherein said interlocking means includes:
a. a plurality of outer longitudinal strips, each having ribs thereon, extending inwardly toward said inner sheath, said outer longitudinal strip abutting said outer resilient sheath;
b. a plurality of inner concentrically positioned longitudinal strips, each having ribs thereon, extending outwardly toward said outer resilient sheath, each of said inner longitudinal strips abutting said inner resilient sheath; and
c. each of said outwardly extending ribs of said inner longitudinal strips alternately overlapping with adjacent said inwardly extending ribs of said outer longitudinal strips wherein said inner and outer longitudinal strips remain overlapped during radial expansion and radial contraction of said inner and outer resilient sheaths.

14. The structure as set forth in claim 13 wherein said ribs of each of said inner and outer longitudinal strips include first and second ribs extending outwardly from each of said strips and wherein during contraction one of each of said first ribs of each of said inner longitudinal strips is adjacent one of each of said second ribs of each of said second outer longitudinal strips and wherein after radial expansion of said yieldable unit one of each of said first ribs of each of said longitudinal strips is adjacent one of each of said first ribs of each of said outer longitudinal strips.

15. A yieldable unit comprising:
a. a hollow inner cylindrical yieldable sheath;
b. spaced holding members for supporting said inner sheath therebetween;
c. an outer cylindrical yieldable sheath positioned concentrically relative to said inner sheath;
d. spaced collar members for supporting said outer sheath therebetween;
e. a plurality of longitudinally positioned strips positioned between said sheaths, said strips including:
  1. a plurality of spaced longitudinal outer strips, each having arms and a body, said arms extending toward said inner sheath;
  2. a plurality of alternately spaced longitudinal inner strips, each having arms and a body, said arms extending toward said outer sheath;
  3. each of said arms of each of said outer strips interlocking with each of said adjacent arms of said inner strips; and
f. fluid means positioned between said inner and outer sheaths to provide continuous lubrication for said strips wherein pressure on said outer yieldable sheath and/or said fluid means causes said strips to yield radially inwardly until said arms of said inner strip contact adjacent said arms of said inner strip and said arms of said outer strip contact adjacent said arms of said outer strip when said unit is in its maximum inwardly yieldable position.

16. The structure as set forth in claim 15 wherein positioning of said unit in an initial yieldable position enables pressure on said inner yieldable sheath to yield said outer yieldable sheath.

17. The structure as set forth in claim 15 wherein said arms of said inner and outer strips are overlapped with adjacent arms of outer and inner strips, respectively, when said unit is partially yielded and wherein said arms of adjacent inner strips and said arms of adjacent outer strips do not contact one another in such partially yielded position.

18. The structure as set forth in claim 15 wherein:
a. said outer strips each includes a body and first and second arms, said first arm extending toward said body of an inner strip and said second arm extending toward said body of an adjacent inner strip;
b. said inner strips each includes a body and first and second arms, said first arm extending toward said body of one of any outer strip and said second arm extending toward said body of an adjacent outer strip; and,
c. wherein yielding of said strips causes said strips to move radially inwardly until each of said first and second arms of said inner strip contacts one adjacent arm of said first and second arms of said adjacent inner strip and each of said first and second arms of said outer strip contacts one adjacent arm of said first and second arms of said adjacent outer strip in a maximum inwardly yielded position.

19. The structure as set forth in claim 15 wherein inward radial yielding of said strips enables one of each of said first arms of said inner strips to contact one of each of said first arms of said adjacent inner strips and one of each of said second arms of said outer strip to contact one of each of said second arms of said adjacent outer strips to prevent further inward radial yielding of said yieldable unit.

20. The structure as set forth in claim 15 wherein each of said arms of each of said strips have grooves therein for enabling said fluid means to move relative to each of said strips.

* * * * *